United States Patent [19]
Yamamoto

[11] Patent Number: 6,030,082
[45] Date of Patent: Feb. 29, 2000

[54] ILLUMINATION OPTICAL SYSTEM AND PROJECTOR APPARATUS USING THE SAME

[75] Inventor: Chikara Yamamoto, Omiya, Japan

[73] Assignee: Fuji Photo Optical Co., Ltd., Saitama, Japan

[21] Appl. No.: 09/272,306

[22] Filed: Mar. 19, 1999

[30] Foreign Application Priority Data

Mar. 24, 1998 [JP] Japan .................................. 10-095380

[51] Int. Cl.[7] .................................................. G03B 21/14
[52] U.S. Cl. ................................................. 353/38; 353/69
[58] Field of Search ................................. 353/31, 33, 34, 353/37, 38, 69, 70

[56] References Cited

U.S. PATENT DOCUMENTS

| | | | |
|---|---|---|---|
| 5,085,506 | 2/1992 | Kahn et al. | 353/38 |
| 5,098,184 | 3/1992 | Van Den Brandt et al. | 353/38 |
| 5,418,583 | 5/1995 | Masumoto | 353/38 |
| 5,473,393 | 12/1995 | Manabe | 353/38 |
| 5,662,401 | 9/1997 | Shimizu et al. | 353/38 |
| 5,786,939 | 7/1998 | Watanabe | 353/38 |
| 5,959,704 | 9/1999 | Suzuki et al. | 353/38 |

*Primary Examiner*—William Dowling
*Attorney, Agent, or Firm*—Ronald R. Snider; Snider & Associates

[57] ABSTRACT

In an illumination optical system whose optical axis is inclined with respect to the normal of a liquid crystal display panel 23, the form of each lens element constituting each of flyeyes (integrator plates) 11A, 11B of an integrator section 11 is adjusted in a direction along which extends a line of intersection formed between each of the flyeyes 11A, 11B and a plane including the optical axis of the integrator section 11 and the normal of the liquid crystal display panel 23, such that, when a luminous flux is obliquely incident on the liquid crystal display panel 23, its illumination area on the liquid crystal display panel 23 has a size larger than the effective area of the liquid crystal display panel 23 by a slight margin, whereby illumination efficiency is prevented from decreasing on the liquid crystal display panel 23.

16 Claims, 5 Drawing Sheets

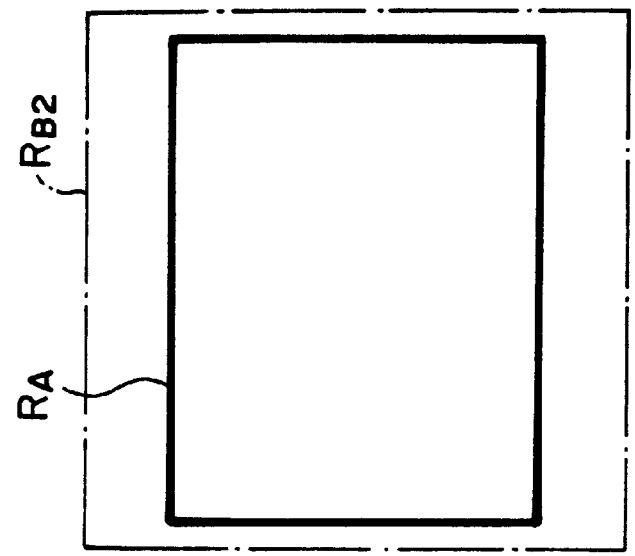
FIG.3
INCLINING
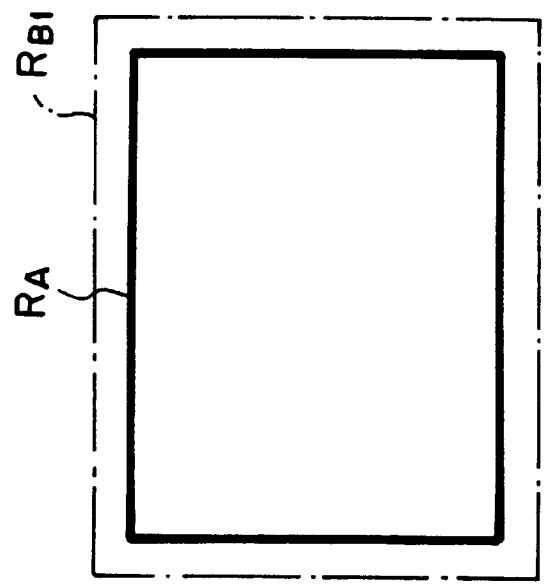

FORM OF IMAGE DISPLAY PANEL

FORM OF INTEGRATOR PANEL

FORM OF INTEGRATOR PANEL

FORM OF INTEGRATOR PANEL

ILLUMINATION OPTICAL SYSTEM AND PROJECTOR APPARATUS USING THE SAME

RELATED APPLICATIONS

This application claims the priority of Japanese Patent Application No. 10-95380 filed on Mar. 24, 1998, which is incorporated herein by reference.

BACKGROUND OF THE INVENTION

1. Field of the Invention

The present invention relates to an illumination optical system for enlarging an image displayed on image display means such as a liquid crystal display panel or micromirror device panel and projecting thus enlarged image onto a screen, and a projector apparatus using the same; and, in particular, to an improvement in the relative positional relationship between the image display means and an integrator section for homogenizing the illumination of light illuminating the image display means, and an improvement in their structures.

2. Description of the Prior Art

In illumination optical systems for liquid crystal projectors, there has conventionally been known a technique using an optical system which employs an integrator for eliminating unevenness in illumination on liquid crystal display panels.

Namely, such an illumination optical system comprises a first integrator plate (generally known as second flyeye or the like), a second integrator plate (generally known as first flyeye or the like), and a field lens successively disposed in this order downstream a light source section using a reflector. The first integrator plate is constituted by a plurality of lens elements, each having a form substantially analogous to that of a liquid crystal display panel, which are arranged two-dimensionally, and splits a luminous flux having a relatively higher degree of unevenness in brightness emitted from the light source section into partial luminous fluxes by the number identical to that of the lens elements in the first integrator plate. Thus obtained partial luminous flux has a lower degree of unevenness in brightness as compared with the luminous flux before being split. By means of the second integrator plate and the field lens, the individual partial luminous fluxes are emitted toward an area to be illuminated, so as to be superposed on one another, whereby it is possible to realize illumination with less unevenness in brightness.

Meanwhile, though it is desirable for the optical system using an integrator to be designed such as to secure an illumination area which is large enough to absorb influences of errors in manufacture of the integrator itself or mirrors, lenses, and the like disposed on the optical path, it is important that the form of the illumination area be basically made slightly larger than the liquid crystal display panel at most, so as to minimize the decrease in illumination efficiency.

On the other hand, since the projection lens employed in a liquid crystal projector is often used as being shifted in a direction perpendicular to the optical axis of its liquid crystal display panel, it is generally designed such that its liquid crystal side is formed into a telecentric system. Also, in conjunction therewith, the illumination optical system using an integrator is generally designed as a system in A which the luminous flux becomes telecentric after passing through the liquid crystal display panel. When such a telecentric system is formed, however, it may be problematic in that a large number of lenses are needed as the projection lens, each lens has a larger diameter, and so forth, thereby increasing the size and cost of the apparatus.

Therefore, the conventional illumination optical system using an integrator employed in the liquid crystal projector may simply be inclined as a whole with respect to the liquid crystal display panel, so that the luminous flux emitted from the liquid crystal display panel forms a predetermined angle with its normal, thereby constituting a so-called non-telecentric system.

When the illumination optical system is simply arranged so as to be inclined as a whole with respect to the liquid crystal display panel, however, since each lens element of the first integrator panel, i.e., the integrator plate on the light source side has a form analogous to that of the liquid crystal display panel as mentioned above, the illumination area expands in a direction along which extends the line of intersection formed between the first integrator plate and the plane including the optical axis of the integrator and the normal of the liquid crystal display panel, thereby lowering the illumination efficiency.

As image display means, attention has recently been given to the micromirror device panel (DMD) in which a plurality of micromirror devices are arranged. In the micromirror device panel, it is necessary that a luminous flux be made obliquely incident thereon while forming a predetermined angle with the normal of the panel. Therefore, in the case where such a micromirror device panel is used as the image display means, the decrease in illumination efficiency may be problematic as with the case using the liquid crystal display panel.

SUMMARY OF THE INVENTION

In view of such circumstances, it is an object of the present invention to provide an illumination optical system and a projector apparatus which, even when a luminous flux from the illumination optical system using an integrator is made incident on an image display means obliquely with respect to the normal thereof, can prevent illumination efficiency from decreasing on the image display means.

The illumination optical system in accordance with a first aspect of the present invention is an illumination optical system for illuminating image display means which modulates incident light according to image information; the illumination optical system comprising a light source section; and an integrator section including at least two integrator plates, arranged in an optical axis direction of the light source section, for homogenizing the quantity of light emitted from the light source section;

wherein an optical axis of the integrator section is set so as to be inclined with respect to a normal of a surface on which a luminous flux to the image display means is incident; and wherein the form of each device of a first integrator plate closest to the light source section in the integrator section is adjusted in a direction along which extends a line of intersection formed between the first integrator plate and a plane including an optical axis of the integrator section and the normal such that, when the luminous flux emitted from the integrator section illuminates the image display means, an illumination area formed by the luminous flux corresponds to the form of the image display means.

The illumination optical system in accordance with a second aspect of the present invention is an illumination optical system comprising a light source section for emitting white light; and an integrator section including at least two integrator plates, arranged in an optical axis direction of the light source section, for homogenizing the quantity of the white light; the illumination optical system illuminating three image display means which modulate, by way of a color-decomposing optical section for decomposing the white light into color light components of blue, green, and red, the respective color light components according to image information;

wherein an optical axis of the integrator section is set so as to be inclined with respect to a normal of a surface on which a luminous flux to each image display means is incident; and wherein the form of each device of a first integrator plate closest to the light source section in the integrator section is adjusted in a direction along which extends a line of intersection formed between the first integrator plate and a plane including an optical axis of the integrator section and the normal such that, when the luminous flux emitted from the integrator section illuminates each image display means, an illumination area formed by the luminous flux corresponds to the form of the image display means.

Preferably, at least two integrator plates constituting the integrator section have forms and sizes identical to each other, since their manufacturing costs can be lowered thereby.

The image display means may be constituted by a liquid crystal display panel or micromirror device panel.

With respect to a form analogous to that of an effective area of the image display means, the form of each device constituting the two integrator plates may be flattened in a direction along which a side of the integrator plate set so as to be inclined extends.

The form of each device may be a parallelogram in conformity to an angle which is set so as to attain the inclination.

The devices may be arranged so as to be shifted from each other column by column or row by row.

The projector apparatus in accordance with the present invention is constructed such that the luminous flux emitted from the illumination optical system and transmitted through the image display means is enlarged and projected onto a screen by a projection lens.

Here, the above-mentioned term "correspond" refers not only to the case where the form of the illumination area on the image display means is substantially the same as that of the image display means (effective area) but also to the case where the illumination area is formed slightly larger than the form of the image display means so as to yield a margin for various errors in manufacture.

BRIEF DESCRIPTION OF THE DRAWINGS

FIG. 3 is a view for explaining the relationship between the form of a liquid crystal display panel (image display panel) and the form of an illumination area;

DESCRIPTION OF THE PREFERRED EMBODIMENTS

In the following, embodiments of the present invention will be explained with reference to the accompanying drawings.

Figure 2:
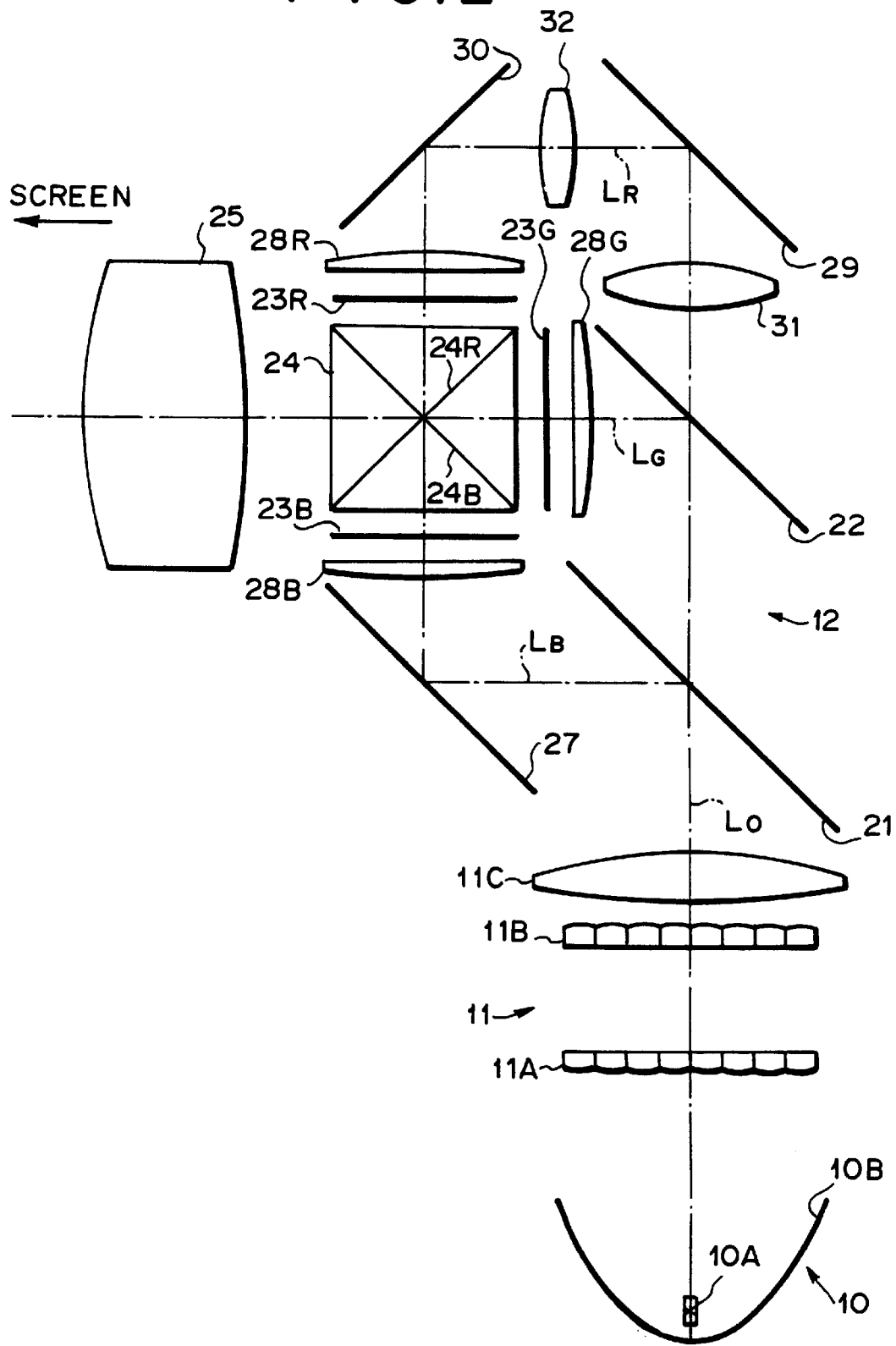
FIG. 2 is a schematic plan view showing a projection type liquid crystal projector apparatus using the illumination optical system of FIG. 1.

FIG. 2 is a schematic view showing the configuration of a projection type liquid crystal projector apparatus in accordance with an embodiment of the present invention.

As shown in FIG. 2, the projection type liquid crystal projector apparatus in accordance with this embodiment comprises a light source section 10, an integrator section 11 for mixing a white luminous flux emitted from the light source section 10 so as to homogenize its light quantity distribution, and a projector section 12 for causing the luminous flux turned into homogenous light by the integrator section 11 to carry color image information and projecting this light onto a screen.

Figure 1:
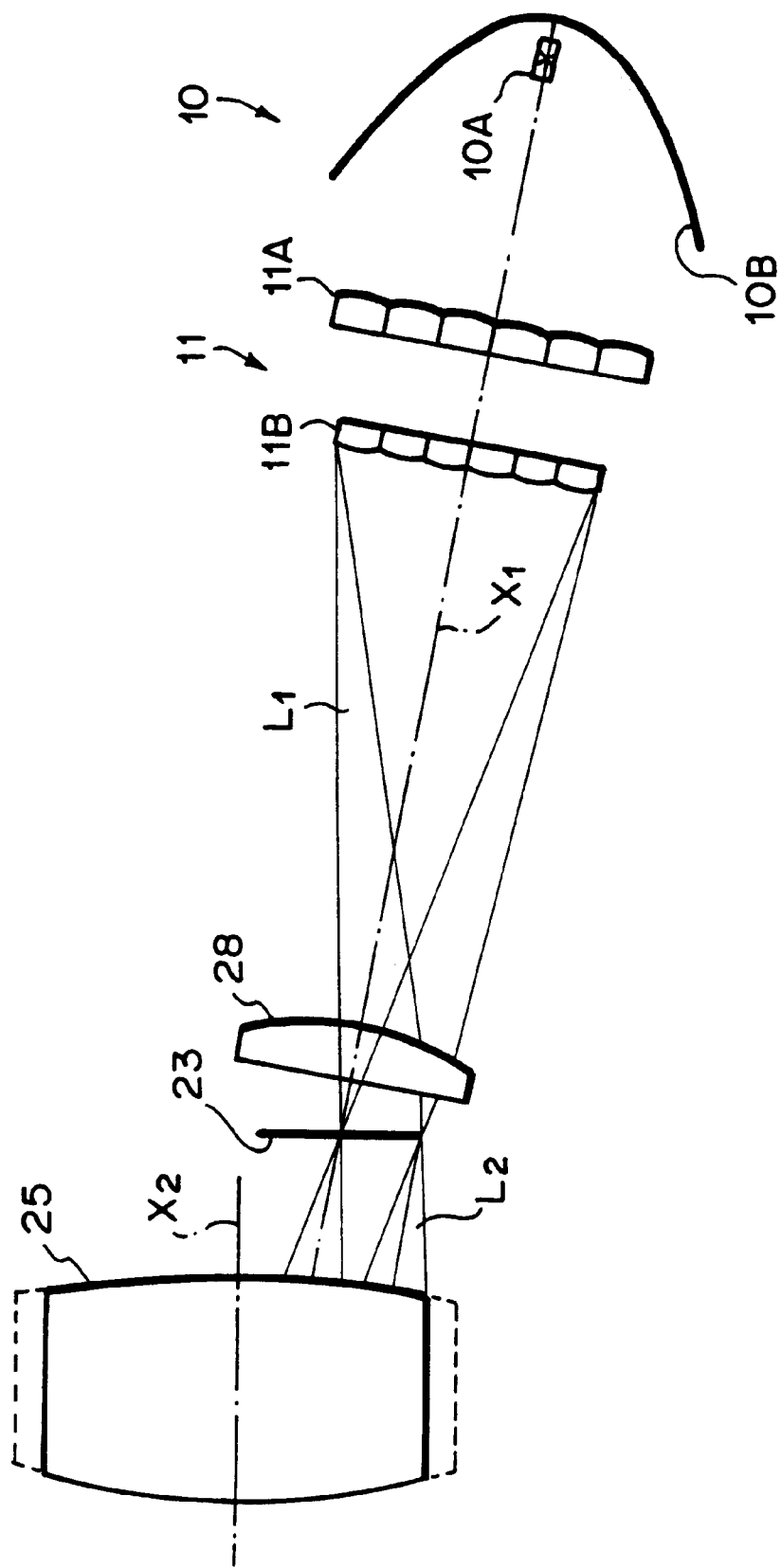
FIG. 1 is a schematic view showing an illumination optical system in accordance with an embodiment of the present invention.

As shown in FIG. 1, the light source section 10 comprises an illuminator 10A made of a discharge tube such as xenon lamp or halide lamp, and a reflector 10B made of a parabolic mirror.

Namely, the reflector 10B made of a parabolic mirror has a focal position at the light-emitting source of the illuminator 10A and reflects part of the luminous flux emitted from the illuminator 10A toward the backside and outside of the optical axis $L_o$ of the light source section 10 as a luminous flux substantially parallel to the optical axis $L_o$.

The integrator section 11 comprises a second flyeye (first integrator plate) 11A acting on the luminous flux from the light source section 10, a first flyeye (second integrator plate) 11B for superposing the respective luminous fluxes from individual lens elements of the second flyeye 11A onto liquid crystal display panels which will be explained later, and a convex field lens 11C.

Each of the two flyeyes 11A, 11B is constituted by minute lens elements arranged regularly. Each lens element has a form analogous to the effective area of each of liquid crystal display panels 23B, 23G, 23R.

On the other hand, the projector section 12 comprises a B/GR separating dichroic mirror 21 for separating the luminous flux homogenized by the integrator section 11 into a B component LB and a GR component LG, LR; a G/R separating dichroic mirror 22 for separating the GR component LG, LR emanating from the dichroic mirror 21 into a G component LG and an R component LR; a liquid crystal display panel 23B for displaying an image for the B component; a liquid crystal display panel 23G for displaying an image for the G component; a liquid crystal display panel 23R for displaying an image for the R component; a three-color-combining prism 24 for combining the luminous flux components LB, LG, LR, each carrying image information, transmitted through their respective liquid crystal display panels 23B, 23G, 23R; and a projection lens 25 for projecting the luminous flux composed by the three-color-combining prism 24 onto a screen (not illustrated). The projector section 12 further comprises a total reflection mirror 27 for reflecting the B component LB emanating from the B/GR separating dichroic mirror 21 toward the liquid crystal display panel 23B; a field lens 28B for turning the B component LB reflected by the total reflection mirror 27 into parallel light; a field lens 28G for turning the G component LG emanating from the G/R separating dichroic mirror 22 into parallel light; total reflection mirrors 29, 30 for reflecting the R component LR emanating from the G/R separating dichroic mirror 22 toward the liquid crystal display panel 23R; and a field lens 28R for turning the R component LR emanating from the G/R separating dichroic mirror 22 into parallel light.

In this projection type liquid crystal projector apparatus, only the R component LR differs from the other components in terms of the optical path length to the three-light-combining prism 24. However, a field lens 31 is disposed between the G/R separating dichroic mirror 22 and the total reflection mirror 29, whereas a relay lens 32 is disposed between the total reflection mirrors 29, 30, so that the imaging relationship of the R component LR is corrected so as to become apparently equivalent to those of the B component LB and G component LG.

The three-color-combining prism 24 is a cross prism having a dichroic surface 24B for reflecting the B component LB and a dichroic surface 24R for reflecting the R component LR.

In the projection type projector apparatus, the liquid crystal display panels 23B, 23G, 23R are often used as being shifted in a direction perpendicular to the optical axis of the projection lens 25. Conventionally, it has been a common practice to form a telecentric system on the side of the liquid crystal display panels 23B, 23G, 23R from the projection lens 25, and also arrange the illumination optical system such that it becomes a system in which the luminous flux becomes telecentric after passing through the liquid crystal display panels 23B, 23G, 23R. However, forming such a telecentric system is disadvantageous in that a large number of lenses is necessary as the projection lens 25, the diameter of each lens becomes greater, and so forth.

Therefore, in this embodiment, as shown in FIG. 1 (partly omitting optical members), the whole illumination optical system constituted by the light source section 10, integrator section 11, and field lens 28 is inclined in a vertical direction (while not being inclined in horizontal directions as shown in FIG. 2) such that the optical axis $X_1$ of this optical system forms a predetermined angle with the normal of the liquid crystal display panel 23 (one liquid crystal display panel representing the three liquid crystal display panels 23B, 23G, 23R), whereby, after the luminous flux from the illumination optical system has passed through the liquid crystal display panel 23, its principal ray is not parallel (non-telecentric) to the optical axis $X_2$ of the projection lens 25 and is made incident on the projection lens 25 so as to approach the optical axis $X_2$.

As a consequence, the projection lens 25 can reduce its number of lenses. Also, as depicted, its diameter can be made smaller than the lens size (indicated by broken line) in the case of a telecentric system.

In the illumination optical system using the integrator 11, on the other hand, though it is desirable for the illumination area on each of the liquid crystal display panels 23B, 23G, 23R to be made larger than the effective area of each liquid crystal display panel by a slight margin, it is necessary for such a margin to be minimized so as to secure a high illumination efficiency.

This embodiment, however, has a simple configuration in which the conventional illumination optical system is inclined with respect to the normal of the liquid crystal display panel 23 by a predetermined angle as mentioned above, and each lens element constituting each of the flyeyes 11A, 11B has a form analogous to the effective area of the liquid crystal display panel 23, whereby, with respect to the liquid crystal display panel 23, the illumination area expands in a direction along which extends a line of intersection formed by the liquid crystal display panel 23 and a plane including the optical axis of the integrator section 11 and the normal of the liquid crystal display panel 23, so that the ratio of the illumination area that is not effectively usable increases, thereby greatly lowering its illumination efficiency.

When the illumination optical system is not inclined with respect to the normal of the liquid crystal display panel 23, the illumination area $R_{B1}$ is greater than the effective area $R_A$ of the liquid crystal display panel 23 only by a slight margin as shown on the left side of FIG. 3. When the illumination optical system is inclined with respect to the normal of the liquid crystal display panel 23 as in the case of this embodiment, by contrast, the illumination area $R_{B2}$ becomes much larger than the effective area $R_A$ of the liquid crystal display panel 23 by greatly expanding upward and downward in the drawing (in a direction along which extends a line of intersection formed by the liquid crystal display panel 23 and a plane including the optical axis of the integrator section 11 and the normal of the liquid crystal display panel 23), thereby reducing the illumination efficiency.

Therefore, in this embodiment, the form of each lens element constituting each of the flyeyes (integrator plates) 11A, 11B is adjusted in a direction along which extends a line of intersection formed by each of the flyeyes 11A, 11B and a plane including the optical axis of the integrator section 11 and the normal of the liquid crystal display panel 23, such that, when the luminous flux is obliquely incident on the liquid crystal display panel 23, the illumination area on the liquid crystal display panel 23 is larger than the effective area of the liquid crystal display panel 23 by a slight margin.

Figure 4A:
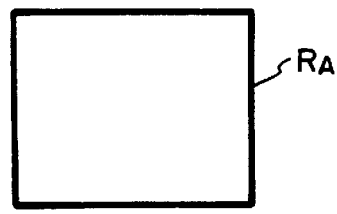
FIGS. 4A to 4D are views for explaining configurations of flyeyes (integrator plates) shown in FIG. 1.
Figure 4B:
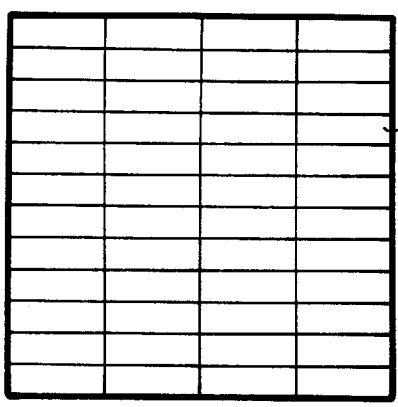

This feature will now be explained specifically with reference to FIGS. 4A to 4D. FIG. 4A shows the form of the effective area of the liquid crystal display panel 23, whereas FIG. 4B shows the form of the flyeyes 11A, 11B3 in this embodiment. In the case where the illumination optical system is inclined about an axis parallel to the longer sides of the liquid crystal display panel 23, then it will be sufficient if each lens element 111A constituting an area $R_{c1}$ of each of the flyeyes 11A, 11B has a form, as shown in FIG. 4B, flattened with respect to a form analogous to the effective area $R_A$ of the liquid crystal display panel 23 by a predetermined amount in a direction along which its shorter sides extend.

Figure 4C:
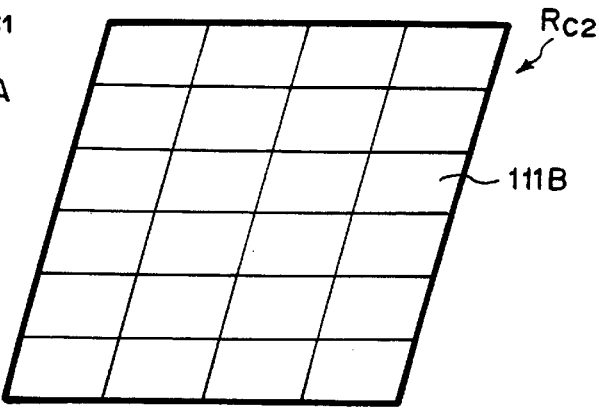

On the other hand, in the case where the liquid crystal display panel 23 is illuminated while the illumination optical system is inclined not only about an axis parallel to the longer sides of the liquid crystal display panel 23 but also about an axis parallel to the shorter sides thereof, it will be sufficient if each lens element 111B constituting an area $R_{c2}$ of each of the flyeyes 11A, 11B is formed into a parallelogram in conformity to the respective angles of inclination with respect to the individual directions as shown in FIG. 4C.

Figure 4D:
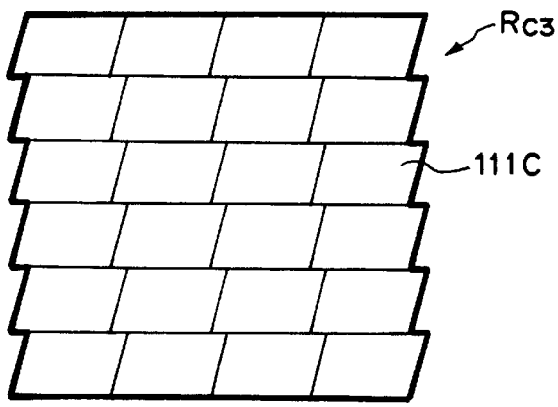

In the case where each lens element is thus formed into a parallelogram, since the cross-sectional form of the luminous flux in the above-mentioned light source section 10 (depending on the form of the reflector 10B) is substantially circular, it is desirable that, as shown in FIG. 4D, while each lens element 111C is formed into a parallelogram, the lens elements 111C are arranged so as to be shifted row by row or column by column such that the whole area $R_{c3}$ approximates the above-mentioned cross-sectional form of the luminous flux, thereby keeping the utilization efficiency of illumination light from decreasing.

The illumination optical system of the present invention is applicable not only to projection type liquid crystal projector apparatus using liquid crystal display panels but also to various kinds of projector apparatus using other image display means. For example, as shown in FIG. 5, the illumination optical system of the present invention is also applicable to a projector apparatus using a so-called DMD (digital mirror device), in which micromirror devices are arranged, as its image display means.

Figure 5:
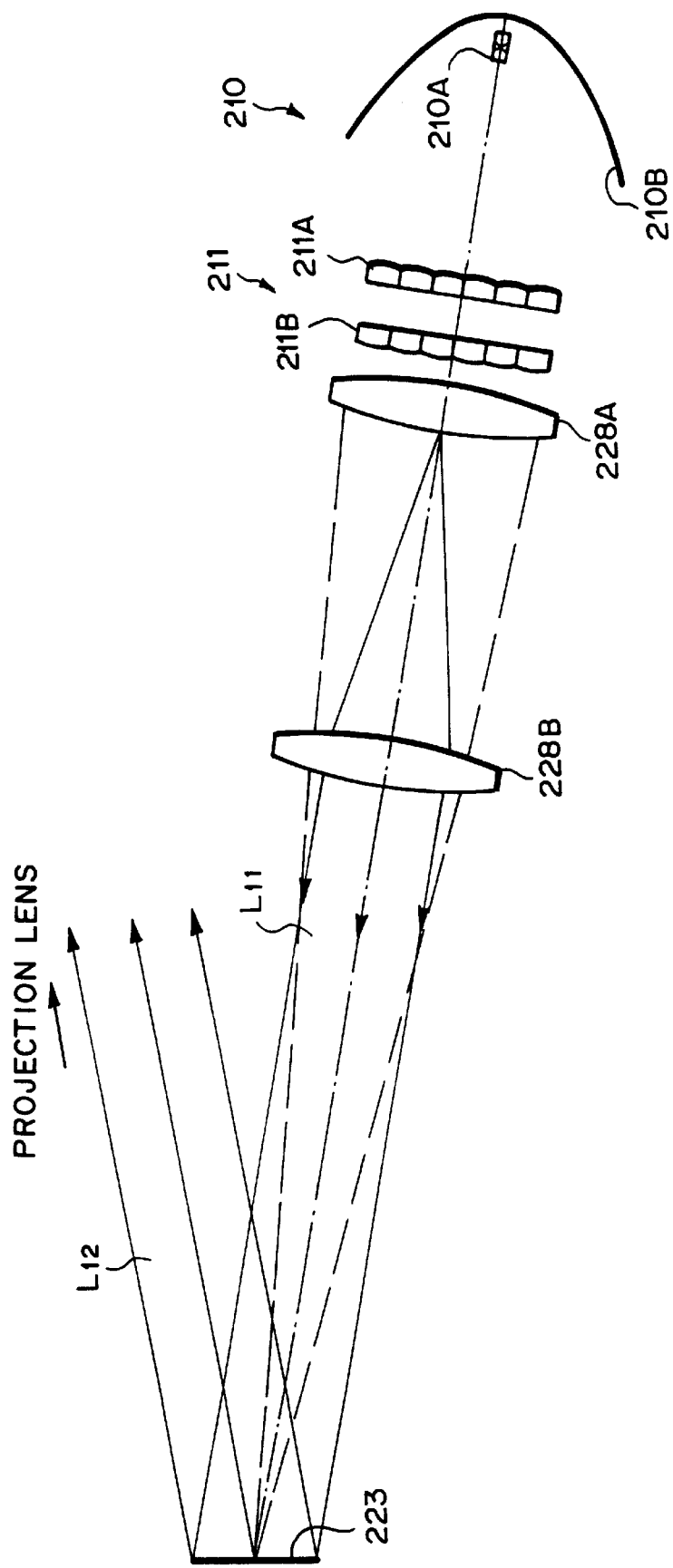
FIG. 5 is a schematic view for explaining an illumination optical system in accordance with an embodiment different from that shown in FIG. 1.

In the apparatus shown in FIG. 5, an illumination optical system comprising a light source section 210 and an integrator section 211 is disposed as being inclined in both vertical and horizontal directions with respect to a DMD 223, and illumination light $L_{11}$ obliquely irradiates the DMD 223, so that a luminous flux $L_{12}$ modulated by an image signal is reflected by the DMD 223 toward a projection lens (not illustrated), and then the luminous flux $L_{12}$ carrying image information is enlarged and projected onto a screen (not illustrated).

Here, the light source section 210 comprises an illuminator 210A and a reflector 210B. The integrator section 211 comprises two flyeyes (integrator plates) 211A, 211B and two field lenses 228A, 228B. The lens elements constituting the flyeyes 211A, 211B are formed and arranged as shown in FIG. 4C or 4D.

Without being restricted to the above-mentioned embodiments, the illumination optical system of the present invention and the projector apparatus using the same can be modified in various manners. For example, though the projection type liquid crystal projector apparatus shown in FIG. 2 is equipped with a three-plate type liquid crystal display panel for forming a color image, it may be equipped with a single-plate type liquid crystal display panel instead. In this case, the light from the light source section may be monochromatic light as well, without necessitating optical systems for separating and combining the individual color light components.

In each of the above-mentioned embodiments, two flyeyes (integrator plates) have forms identical to each other, and the lens elements constituting these flyeyes have forms identical to each other, whereby the manufacturing cost of the flyeyes can be reduced. However, these two flyeyes and their constituent lens elements may be different from each other as long as at least the flyeye positioned closest to the light source satisfies the above-mentioned features of the present invention.

Also the configurations of lens systems shown in FIGS. 1, 2, and 5 are merely examples for explanation, and the kind of lenses, the number of lenses, and so forth can be changed appropriately as circumstances demand.

As explained in the foregoing, in the illumination optical system of the present invention, the whole illumination optical system is disposed so as to be inclined with respect to the normal of the image display means, such that the image display means are obliquely illuminated, whereby the image display means side of the projection lens becomes a non-telecentric system. Consequently, as compared with the conventional illumination optical system, without adding other particular members, the number of lenses in the projection lens can be cut down, and the diameter of each lens can be reduced, whereby the apparatus can be made more compact and less expensive.

Also, since each lens element of the first integrator plate closest to the light source section in the integrator section is adjusted in a direction along which extends a line of intersection formed between the first integrator plate and a plane including an optical axis of the integrator section and the normal such that, when the luminous flux emitted from the integrator section illuminates the image display means, an a illumination area formed by the luminous flux corresponds to the form of the image display means, the illumination area on the image display means can have a form substantially equivalent to that of the image display means or larger by a predetermined margin. As a consequence, even when the illumination luminous flux is obliquely incident on the image display means, the utilization efficiency of illumination can be prevented from decreasing.

The projector apparatus using the above-mentioned illumination optical system can attain similar effects, thereby being capable of making the apparatus more compact and less inexpensive, without greatly changing the configuration and lowering the utilization efficiency of illumination light as compared with the conventional apparatus.

What is claimed is:

1. An illumination optical system for illuminating image display means which modulates incident light according to image information, said illumination optical system comprising a light source section; and an integrator section including at least two integrator plates, arranged in an optical axis direction of the light source section, for homogenizing the quantity of light emitted from said light source section;

wherein an optical axis of said integrator section is set so as to be inclined with respect to a normal of a surface on which a luminous flux to said image display means is incident; and wherein the form of each device of a first integrator plate closest to said light source section in said integrator section is adjusted in a direction along which extends a line of intersection formed between said first integrator plate and a plane including an optical axis of said integrator section and the normal such that, when said luminous flux emitted from said integrator section illuminates said image display means, an illumination area formed by said luminous flux corresponds to the form of said image display means.

2. An illumination optical system according to claim 1, wherein at least two integrator plates constituting said integrator section have forms and sizes identical to each other.

3. An illumination optical system according to claim 1, wherein, with respect to a form analogous to that of an effective area of said image display means, the form of each device constituting said two integrator plates is flattened in a direction along which a side of said integrator plate set so as to be inclined extends.

4. An illumination optical system according to claim 3, wherein each said device is formed into a parallelogram in conformity to an angle which is set so as to attain said inclination.

5. An illumination optical system according to claim 4, wherein said devices are arranged so as to be shifted from each other column by column or row by row.

6. An illumination optical system according to claim 1, wherein said image display means is a liquid crystal display panel.

7. An illumination optical system according to claim 1, wherein said image display means is a micromirror device panel.

8. A projector apparatus using the illumination optical system according to claim 1, wherein the luminous flux emitted from said illumination optical system and transmitted through said image display means is enlarged and projected onto a screen by a projection lens.

9. An illumination optical system comprising a light source section for emitting white light; and an integrator section including at least two integrator plates, arranged in an optical axis direction of said light source section, for homogenizing the quantity of said white light; said illumination optical system illuminating three image display means which modulate, by way of a color-decomposing optical section for decomposing said white light into color light components of blue, green, and red, the respective color light components according to image information;

wherein an optical axis of said integrator section is set so as to be inclined with respect to a normal of a surface on which a luminous flux to each said image display means is incident; and wherein the form of each device of a first integrator plate closest to said light source section in said integrator section is adjusted in a direction along which extends a line of intersection formed between said first integrator plate and a plane including an optical axis of said integrator section and said normal such that, when said luminous flux emitted from said integrator section illuminates each said image display means, an illumination area formed by said luminous flux corresponds to the form of said image display means.

10. An illumination optical system according to claim 9, wherein at least two integrator plates constituting said integrator section have forms and sizes identical to each other.

11. An illumination optical system according to claim 9, wherein, with respect to a form analogous to that of an effective area of said image display means, the form of each device constituting said two integrator plates is flattened in a direction along which a side of said integrator plate set so as to be inclined extends.

12. An illumination optical system according to claim 11, wherein each said device is formed into a parallelogram in conformity to an angle which is set so as to attain said inclination.

13. An illumination optical system according to claim 12, wherein said devices are arranged so as to be shifted from each other column by column or row by row.

14. An illumination optical system according to claim 9, wherein said image display means is a liquid crystal display panel.

15. An illumination optical system according to claim 9, wherein said image display means is a micromirror device panel.

16. A projector apparatus using the illumination optical system according to claim 9, wherein the luminous flux emitted from said illumination optical system and transmitted through said image display means is enlarged and projected onto a screen by a projection lens.

* * * * *